3,044,951
HYDROCARBON CONVERSION PROCESS
Warren G. Schlinger, Pasadena, and Du Bois Eastman, Whittier, Calif., assignors to Texaco Inc., a corporation of Delaware
Filed June 5, 1958, Ser. No. 740,060
3 Claims. (Cl. 208—58)

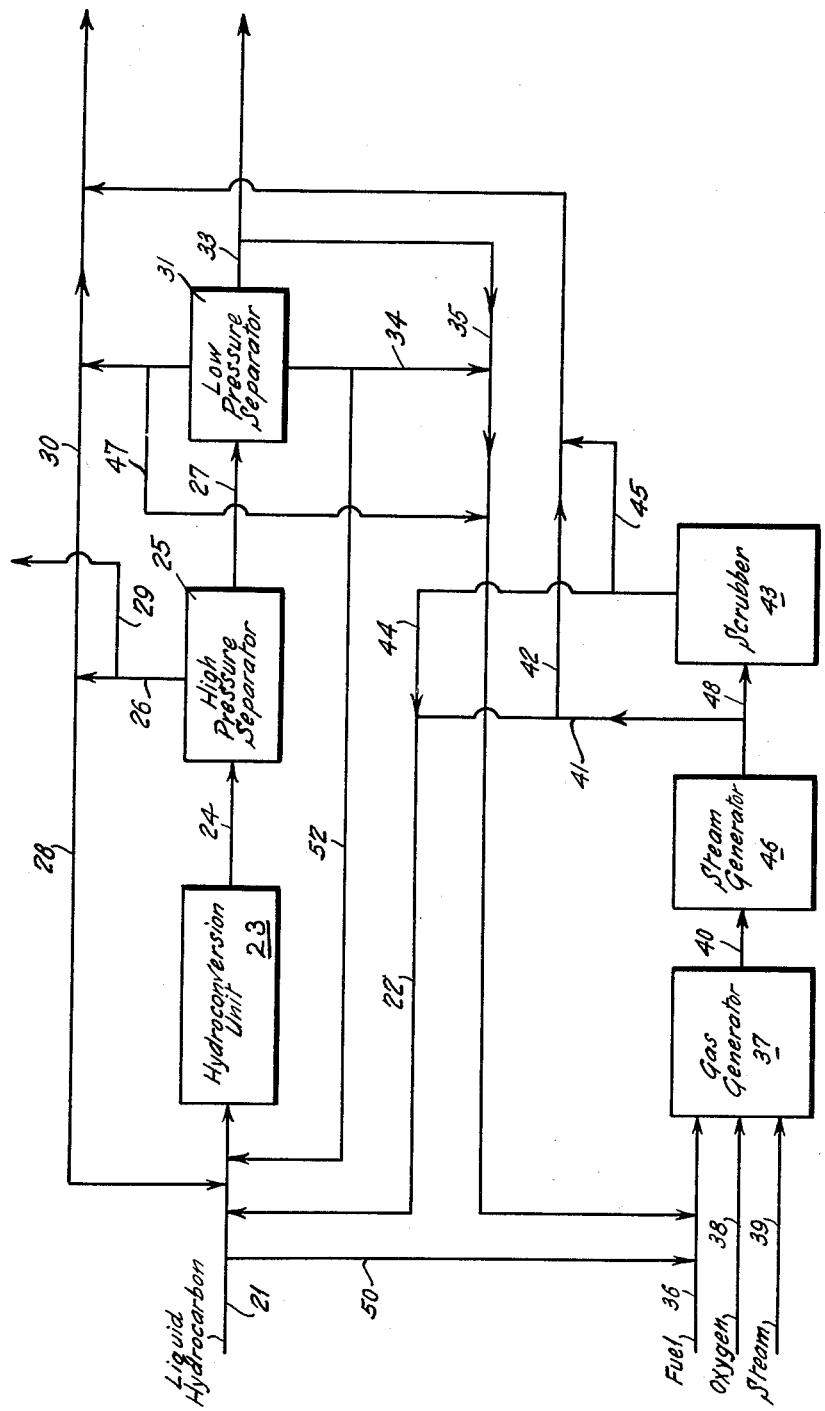

This invention relates to the hydroconversion of hydrocarbons. More particularly, it relates to the apolymeric hydroconversion of liquid hydrocarbons by contacting the liquid hydrocarbon with a gas containing hydrogen under conditions of turbulent flow and at temperatures and pressures to convert at least a portion of the liquid hydrocarbon into more valuable products.

In the hydroconversion processes of the prior art the yields of desirable lighter products have been unsatisfactory whereas yields of undesirable products such as high polymers and coke have been uneconomically high. The destructive or splitting type of conversion can be likened to viscosity breaking, a mild thermal process generally carried out at temperatures of about 935° F. and pressures of about 50 p.s.i.g. Deeper conversion by thermal cracking results in the formation of large amounts of high polymers and coke, particularly in the case of heavy petroleum oils which are liquid or a portion thereof is liquid at reaction conditions. In these latter instances hydrogen has been added to the thermal cracking process in an attempt to suppress the formation of high polymers and coke. However, even with the presence of hydrogen, prior art hydroconversion processes have still produced large amounts of high polymers and coke.

In the conventional hydroconversion of petroleum oils as practiced in Germany, the main or splitting reaction is carried out in large reactors which contain a heavy viscous phase through which relatively pure hydrogen is bubbled. The poor agitation in this system limited the rate at which the reaction could proceed and although the reaction was carried out under mild conditions, it was accompanied by the production of large amounts of high polymers and coke.

Apparently the reason for the production of the undesirable high polymers and coke, even when hydrogen is added, is that the hydrogen does not reach the site of the reaction in sufficient amounts to react with the active fragments produced by the cracking and as a result the active fragments inter-react to form polymers. When deeper conversion, as by thermal cracking is attempted at higher temperatures, it has been the practice in prior hydroconversion processes to increase the hydrogen concentration in the reaction zone. However, the increased hydrogen concentration has not rendered prior hydroconversion processes satisfactory because, as the temperature is increased, the rate of cracking increases more rapidly than does the rate of solution or diffusion of the hydrogen into the hydrocarbon and consequently even at higher hydrogen concentrations, the cracking reaction proceeds more rapidly than the hydrogen can dissolve or diffuse to the reaction site to react with the active fragments of cracking. As a result, although the overall concentration of the hydrogen in the reaction zone may be high, there are many areas in the reaction zone where there is a local deficiency of hydrogen either because it has never reached that particular area or because it has been consumed but not replaced, and consequently the formation of polymers is not prevented in the hydroconversion processes of the prior art.

One method of effecting the apolymeric hydroconversion of a liquid hydrocarbon is to subject the hydrocarbon in intimate mixture with a gas containing hydrogen to conditions of highly turbulent flow at elevated temperatures and pressures. Such conditions may be obtained by flowing the reactants at high velocities as a confined stream through a coil or tubular conduit.

The apolymeric hydroconversion is effected at temperatures between 800 and 1500° F., preferably between about 900 and 1100° F. Superatmospheric pressures ranging from 500 to 20,000 p.s.i.g. and higher may be employed. Satisfactory results have been obtained using pressures of 1000 to 10,000 p.s.i.g. Although reaction times of from five seconds to two hours may be used, reaction times of from 20 to 200 seconds are preferred.

In our copending application Serial No. 577,027 filed April 9, 1956, now abandoned, there is described a method for the conversion of hydrocarbon oils by contacting the oil with hydrogen under conditions of turbulent flow.

In the described method, it is disclosed that oil feed rate, hydrogen recycle rate, reaction coil diameter, and operating conditions of temperature and pressure all tend to affect velocity of flow and turbulence. It was found convenient to express turbulence in terms of the ratio of the average apparent viscosity of the flowing stream $$\bar{\epsilon}m$$

to the molecular or kinematic viscosity $\nu$, viz $$\frac{\bar{\epsilon}m}{\nu}$$

and to refer to this ratio $$\frac{\bar{\epsilon}m}{\nu}$$

as turbulence level. The apparent viscosity of the flowing stream $\epsilon m$, equals the sum of the eddy viscosity, $em$, and the kinematic viscosity $\nu$ which may be shown by the expression $\epsilon m = em + \nu$. Under conditions of turbulence $em$ has a finite value and it is apparent that if the magnitude of the apparent viscosity exceeds the kinematic viscosity at the point in question the ratio of $$\frac{\epsilon m}{\nu}$$

exceeds unity. For a given turbulent system, it follows that the average value of the ratio, as expressed by $$\frac{\bar{\epsilon}m}{\nu}$$

exceeds unity. The average apparent viscosity $$\bar{\epsilon}m$$

as employed herein is defined by the equation $$\bar{\epsilon}m = \frac{1}{r_0} \int_0^{r_0} \epsilon m \, dr$$

where $r_0$ is the radius of the conduit. By substitution and integration, employing the parameters described by Corcoran et al., in Industrial and Engineering Chemistry, volume 44, page 410 (1952), this expression $$\bar{\epsilon}m = \frac{1}{r_0} \int_0^{r_0} \epsilon m \, dr$$

may be rewritten $$\bar{\epsilon}m = \frac{r_0}{15} \sqrt{\frac{r_0 g}{2\sigma} \cdot \frac{dp}{dx}}$$

The latter equation is in terms which may be readily determined for a given system. In the foregoing, $d$ represents differential; $g$ represents acceleration of gravity, feet per second per second; $p$ represents pressure, pounds per square foot; $r_0$ represents radius of conduit in feet; $x$ represents distance, feet; $\epsilon m$ represents eddy viscosity, square feet per second; $\epsilon m$ represents apparent viscosity, square feet per second; $\overline{\epsilon m}$ represents average apparent viscosity, square feet per second; $\nu$ represents kinematic viscosity, square feet per second; and $\sigma$ represents specific weight, pounds per cubic foot. Turbulence levels of at least 25 may be employed but turbulence levels of 50 to 1000 are preferable.

In the above described process, the hydrocarbon feed is intimately mixed with the hydrogenating gas and the intimate mixture of hydrogen and hydrocarbon enables the hydrogen to reach quickly the active centers formed by cracking. By reducing the distance the hydrogen must dissolve or diffuse into the hydrocarbon, the hydrogenation of these active centers is effected smoothly and the formation of polymers is suppressed. When lighter oils are used as the feed stock the oil may be in the vapor state under reaction conditions. When the feed stock is a heavy oil in some cases it or a portion thereof remains liquid under reaction conditions and consequently in this latter instance two phases are present in the reaction zone.

When two phases flow through the same conduit, it is possible to have several types of flow. These various types are stratified flow, wave flow, plug flow, slug flow, annular flow, bubble or froth flow and dispersed or spray flow and are described by Baker in the Oil and Gas Journal, July 26, 1954, page 185 et seq. In the present specification and appended claims the term "intimate mixture" is intended to exclude two-phase flows of the stratified, wave, plug, slug, and annular type.

In the process of the present invention the apolymeric hydroconversion is conducted in the presence of low purity hydrogen. In a preferred embodiment of the present invention, the apolymeric hydroconversion is conducted in the presence of synthesis gas.

The term "synthesis gas" as used in the present specification and claims is intended to mean a gas comprising hydrogen and carbon monoxide in ratios ranging from 0.5 part of hydrogen per part of carbon monoxide by volume to 3 parts of hydrogen per part of carbon monoxide. Accordingly, the hydrogenating gas, in the process of the present invention does not contain more than about 75% hydrogen, and should contain not less than 25% hydrogen. Gas rates of 500 to 25,000 cubic feet per barrel of liquid hydrocarbon feed may be used. Rates of 2000 to 10,000 cubic feet per barrel are preferred.

The synthesis gas may be produced by the partial combusion of a hydrocarbonaceous material such as coal, shale oil, petroleum oils and the like or by the partial combustion, in the presence of steam, of carbonaceous substances such as coke. Any portion of the product of the hydroconversion may also be used as a source of feed for the partial combustion step.

Any liquid hydrocarbon may be treated satisfactorily by the process of the present invention. Such materials as vacuum residuum, kerosene, straight run gas oil, thermally cracked cycle gas oil, whole crude, shale oil, tar sand oil, and the like may be converted advantageously to lighter products such as heating gas or motor fuel.

One advantageous application of the present process is the conversion of a liquid hydrocarbon to heating gas. In this application of the process, all of the liquid products of the hydroconversion may be subjected to partial combustion to produce the synthesis gas for the hydroconversion step. When the gasification of the liquid hydroconversion products produces more synthesis gas than is necessary for the hydroconversion, excess synthesis gas may be combined with the product gas obtained from the hydroconversion.

Another advantageous application of the process is the conversion of a liquid hydrocarbon to a motor fuel of high octane number. When the liquid hydrocarbon starting material is a naphtha fraction boiling in the motor fuel range, the light hydrocarbon gases separated from the reaction product are subjected to partial combustion to supply the synthesis gas necessary for the hydroconversion. The balance of the reaction product, that is, the liquid portion of the product, is a motor fuel of improved octane number.

When the liquid hydrocarbon feed contains hydrocarbon boiling above the motor fuel range, the light hydrocarbon gases separated from the reaction product may be subjected to partial combustion to supply the synthesis gas necessary for the hydroconversion. The synthesis gas may also be produced from the unconverted liquid hydrocarbon in the reaction product boiling above the motor fuel range. It is also possible to recycle all or a portion of the product boiling above the motor fuel range to the hydroconversion zone.

Another advantageous application of the present process is the conversion of a non-pumpable oil such as San Ardo crude or Santa Maria Valley crude or the like into a pumpable oil. It is well known that the temperatures present in an oil well increase in proportion to the depth of the well. Recent studies have shown that the temperatures increase at the approximate rate of 0.015° F. per foot of depth. Thus at depths of 8000 feet temperatures of about 200° F. may be encountered and at depths of 20,000 feet the temperature is approximately 400° F. Oils such as San Ardo crude and the like which are pumpable at the depths and temperatures encountered at the producing formation become extremely heavy and viscous at the temperatures prevailing at the earth's surface and are no longer pumpable, unless special equipment is used or unless they are heated. For convenience, these oils are referred to herein as non-pumpable oils.

Transportation of such heavy oils from the well to the refinery represents a problem. The use of tankers, tank cars and tank trucks has proven unsatisfactory. In some instances, the oil has been diluted with a lighter oil and the mixture has been transported through a pipeline. However, this method is unsatisfactory as usually there is no convenient source of light oil at the well and the light oil must be brought to the well head from the refinery. There is also an additional expense in separating the light oil from the crude at the refinery.

By the process of the present invention the heavy oil is subjected to apolymeric hydroconversion, light hydrocarbon gases are separated from the light liquid product which is pumpable, and the gases are subjected to partial combustion to produce the synthesis gas necessary for the hydroconversion. In this manner the heavy viscous oil can be converted to a pumpable oil.

In the applications of the present process described above the synthesis gas produced by the partial combustion may be sent in its entirety to the hydroconversion zone and passed through the zone on a "once through" basis. Alternatively, a portion of the synthesis gas can be sent to the hydroconversion zone, the effluent from the hydroconversion zone can be separated into a hydrogen containing gas used for recycle and excess synthesis gas not sent to the hydroconversion zone can be ecombined with the light hydrocarbon product gases to produce a heating gas. This latter gas may be used to maintain the reaction zone at reaction temperature and also to preheat the reactants.

The hydrogenating gas or synthesis gas may be produced by the partial combustion of any suitable hydrocarbonaceous material as for example natural gas, coal, or a portion of the hydroconversion product. The feed to the synthesis gas generator is introduced with sufficient oxygen to react exothermically with the feed to autogenously maintain a temperature in the range of 2200° F. to about 3200° F. When the generator is lined with a refractory material which is attacked by ash-forming metallic constituents present in the feed, the amount of oxygen is controlled to convert not less than about 90% and not more than 99.5% of the carbon content in the feed to carbon oxides. The extent of the conversion of the carbon may be varied within this range depending on the amount of ash-forming constituents contained in the feed. The quantity of unconverted carbon should be at least 50 times and preferably 100 times the combined weights of the nickel and vanadium content in the feed on the basis of the weight of the metallic content of the metal-containing constituents present in the feed.

When carbon conversions higher than 99.5% are desired and the feed contains ash-forming constituents, the gas generation is carried out in a generator lined with a spinel. A spinel is composed of a group of multiple oxides of isometric crystalline structure having the general formula $XO.Y_2O_3$ or $XY_2O_4$ where X is a divalent metal such as beryllium, magnesium, calcium, barium, strontium, zinc, cadmium, manganese, iron, cobalt, nickel, copper or tin or mixtures thereof and Y is aluminum, cadmium, indium, vanadium, chromium, manganese, iron, cobalt or nickel. Spinels have been found to be particularly resistant to spalling at gas generation temperatures when the feed to be converted to gas contains ash-forming constituents such as vanadium and nickel.

When the feed to the synthesis gas generator is made up of gaseous hydrocarbons ordinarily no steam need be added to the feed. However, when the feed comprises liquid hydrocarbons or pulverized coal, steam is added.

Preferably the generator is operated at a pressure within the range of from about 100 to about 600 p.s.i.g. and the temperature within the generator is autogenously maintained, preferably within the range of 2500 to 2900° F. From about 1.6 to 2.0 mols of free oxygen are supplied to the gas generator for each million B.t.u.'s gross heating value of the hydrocarbonaceous feed to the generator.

The gaseous effluent from the synthesis gas generator may be sent directly to the hydroconversion unit without quenching. However, since the transfer of materials at such high temperatures requires special apparatus, it is in some cases desirable to cool the gaseous effluent from its reaction temperature of above about 2200° F. to a temperature of, for example, below about 900° F. The cooling may be effected in a variety of ways. For example, the effluent gases may be passed in indirect heat exchange with water for the production of steam or with the feed to the hydroconversion unit to preheat the feed. The effluent gases may also be cooled by direct heat exchange with the recycle gas and the mixture sent to the hydroconversion unit. It is also possible to cool the effluent gases by a combination of the above as by cooling the gases partially by indirect heat exchange and partially by direct heat exchange.

When the synthesis gas contains entrained solid particles, it may be desirable in some instances to scrub the synthesis gas for removal of the entrained particles.

Reference is now made to the accompanying drawing which illustrates diagrammatically a flow scheme for the practice of the present invention.

The liquid hydrocarbon which is to be subjected to a polymeric hydroconversion is fed to the system through line 21, mixed with synthesis gas from line 22 and introduced into hydroconversion unit 23 which is in the form of a tubular reactor. The hydroconversion product is transferred from hydroconversion unit 23 through line 24 to high pressure separator 25 where it is separated into a gas composed for the most part of carbon monoxide and hydrogen withdrawn through line 26 and hydrocarbon material withdrawn through line 27. The gas containing carbon monoxide and hydrogen may be sent to product gas storage through line 30 or it may be recycled to hydroconversion unit 23 through lines 28 and 21. Alternatively a portion may be sent to product storage through line 30 and the balance recycled through lines 28 and 21. To prevent the build-up of undesirable impurities when the gas containing carbon monoxide and hydrogen is recycled, it may be desirable to purge the system of a portion of the gas through line 29. The hydrocarbon material withdrawn from high pressure separator 25 through line 27 is introduced into low pressure separator 31 where it is separated into light hydrocarbon gases withdrawn through lines 32 and 30, a naphtha fraction withdrawn through line 33 and a fraction boiling above about 400° F. withdrawn through line 34.

When it is desired to produce a heating gas as the sole product the hydrocarbon gases removed through line 32 are sent to product gas storage through line 30 and the liquid product withdrawn through line 33 is combined in line 35 with the liquid product withdrawn through line 34 and sent through line 36 to gas generator 37 where they are subjected to partial combustion with oxygen introduced through line 38 in the presence of steam introduced through line 39. The synthesis gas produced by the partial combustion is withdrawn from gas generator 37 through line 40 to steam generator 46 from which it may be sent directly to hydroconversion unit 23 through lines 48, 41, 22 and 21. Excess synthesis gas may be sent to product gas storage through lines 48, 41, 42 and 30.

When the synthesis gas contains carbon and entrained ash-forming constituents it may be transferred from steam generator 46 through line 48 to scrubber 43 where the carbon and ash-forming constituents are removed and the synthesis gas is then sent to hydroconversion unit 23 through lines 44, 22 and 21. Excess synthesis gas is sent to product storage through lines 44, 45, 42 and 30.

When it is desired to produce a high octane motor fuel from, for example, a straight run gasoline, the naphtha fraction withdrawn from low pressure separator 31 is sent to product storage through line 33 and the light hydrocarbon gases withdrawn from low pressure separator 31 are sent to the gas generator 37 through lines 32, 47, 35 and 36, are subjected to partial combustion in gas generator 37 and the synthesis gas so produced is sent to steam generator 46 through line 40 and then to hydroconversion unit 23 through lines 48, 41, 22 and 21.

In like manner when it is desired to convert a non-pumpable oil to a pumpable oil the light hydrocarbon gases recovered from low pressure separator 31 may be used for the production of the synthesis gas.

When it is desired to produce a heating gas from a hydrocarbon liquid such as kerosene or gasoline, a portion of the starting material may be diverted to gas generator 37 through lines 50 and 36. It is also possible to use other fuels for the production of the synthesis gas such as pulverized coal or coke, natural gas or other liquid hydrocarbons.

When it is desired to produce a motor fuel fraction from a heavier material, as for example a gas oil, the light hydrocarbon gases withdrawn from low pressure separator 31 are sent to gas generator 37 through lines 32, 47, 35 and 36, the motor fuel fraction is withdrawn through line 33 and the fraction boiling above about 400° F. is recycled to hydroconversion unit 23 through lines 34, 52 and 21.

Various other combinations not specifically set forth above will be obvious to those skilled in the art.

The following examples are given for illustrative purposes only:

*Example I*

This example illustrates the upgrading of a straight run naphtha to a high octane motor fuel.

A depentanized straight run gasoline having ASTM Research Nos. of 66.4 clear, 83.7 leaded (containing 3 cc. TEL per gallon) is mixed with synthesis gas, the source of which is explained below, and passed through a tubular reactor maintained at an average temperature of 975° F. and an average pressure of 2610 p.s.i.g. The turbulence level as expressed by the ratio $$\frac{\bar{e}m}{\nu}$$

is 25. Hydrogen consumption is 816 s.c.f. per barrel of feed. The product stream is passed to a high pressure separator where a gas composed mainly of carbon monoxide and hydrogen and containing minor amounts of hydrocarbon gases is separated. This gas is recycled to the reactor at a rate of 2900 cu. ft. per bbl. of depentanized gasoline feed. The balance of the product stream is separated into a normally gaseous hydrocarbon fraction composed principally of $C_1$-$C_3$ hydrocarbons and amounting to 31 weight percent basis feed and a $C_4$+ fraction amounting to 74 volume percent basis feed. The debutanized fraction has an ASTM Research Octane No. of 88.8 clear and 100.7 leaded (3 cc. TEL per gal.).

The $C_1$-$C_3$ hydrocarbon fraction is sent to the synthesis gas generator where it is subjected to partial combustion with 1.8 mol oxygen per MM B.t.u. of gross heating value in the $C_1$-$C_3$ hydrocarbon fraction to produce a synthesis gas containing 54% hydrogen and 40% CO. 2300 cu. ft. per bbl. of the synthesis gas is sent to the hydrogenation unit as make-up gas and the balance is used as fuel.

It is also possible to convert only a portion of the hydrocarbon gases sufficient to supply the make-up gas and use the balance of the hydrocarbon gases as fuel or to convert a larger portion of the hydrocarbon gases sufficient to provide the make-up gas and also to blend with the unconverted hydrocarbon gases to make a 500 B.t.u. fuel gas.

*Example II*

This example illustrates both the production of a motor fuel or the production of 500 B.t.u. heating gas from a middle distillate.

The feed stock in this example is a middle distillate having the following characteristics:

Gravity, ° API _____ 26.0
Viscosity, SU, at 100° F. _____ 61.2
Flash point, ° F. _____ 240
ASTM distillation:
    IBP _____ 372
    10% _____ 500
    20% _____ 540
    50% _____ 634
    90% _____ ---

The feed stock, at a rate of 2587 pounds per hour, is introduced into a tubular reactor maintained at an average pressure of 5500 p.s.i.g. and an average temperature of 1025° F. A gas containing 57 volume percent hydrogen is recycled at a rate of 8,300 s.c.f. per barrel of feed. The turbulence level in the reaction zone is 115. From this operation there is obtained a net production of 23,960 cubic feet per hour of a gas having a heating value of 1024.7 B.t.u. per cubic foot and 1653 pounds per hour of liquid product. Hydrogen consumption amounts to 1875 cubic feet per barrel of feed. The $C_5$-400° F. fraction of the liquid product (amounting to 54.7%) has clear and leaded ASTM Research Octane Numbers of 86.9 and 93.4 respectively.

For the production of 500 B.t.u. gas the entire liquid product is subjected to partial combustion with oxygen to produce 81,130 cubic feet per hour of synthesis gas. Of this 64,470 cubic feet per hour is blended with the 23,960 cubic feet per hour of 1024.7 B.t.u. gas to yield a product having a heating value of 500 B.t.u. per cubic foot. The balance is introduced into the recycle gas stream as make-up gas.

*Example III*

This example illustrates the conversion of a non-pumpable oil to a pumpable oil. The reaction conditions and a comparison of the feed and product are tabulated below.

Reaction conditions:
    Average temperature, ° F. _____ 850
    Average pressure, p.s.i.g. _____ 4900
    Gas recycle rate, s.c.f./bbl. _____ 13,850
    Hydrogen concentration recycle gas, percent _____ 54
    Turbulence level _____ 28

Hydrogen consumption is 700 cubic feet per barrel.

|  | Feed | Product |
|---|---|---|
| Gravity, ° API | 5.9 | 12.6 |
| Viscosity, SF: |  |  |
|   122° F | | 76 |
|   210° F | 1,103 | |
| Pour point, ° F | above 130 | 40 |

Obviously, many modifications and variations of the invention, as hereinbefore set forth, may be made without departing from the spirit and scope thereof, and therefore, only such limitations should be imposed as are indicated in the appended claims.

We claim:
1. In a process for the apolymeric hydroconversion of a hydrocarbon liquid in which process hydrogen for the hydroconversion is supplied by the partial combustion of a metal-containing hydrocarbon liquid in a refractory-lined gas generation zone, the improved combination of steps comprising passing an intimate mixture of a hydrocarbon liquid and synthesis gas as a confined stream through an elongated reaction zone at a turbulence level of at least 25, a temperature between about 800 and 1400° F. and a pressure between about 500 and 20,000 p.s.i.g., separating the reaction product into a normally gaseous hydrocarbon portion, a liquid portion boiling in the motor fuel range and a portion boiling above the motor fuel range, subjecting said portion boiling above the motor fuel range to partial combustion with a gas containing free oxygen, converting not less than about 90% and not more than about 99.5% of the carbon present in said portion boiling above the motor fuel range to oxides of carbon to produce a synthesis gas comprising carbon monoxide and hydrogen and introducing the synthesis gas so produced into the hydroconversion zone.

2. The process of claim 1 in which the turbulence level is between 50 and 1,000.

3. The process of claim 1 in which the synthesis gas so-produced is passed through the hydroconversion zone on a once through basis.

References Cited in the file of this patent

UNITED STATES PATENTS

| | | |
|---|---|---|
| 1,888,998 | Mercier | Nov. 29, 1932 |
| 1,942,191 | Steere | Jan. 2, 1934 |
| 1,950,460 | Steffen | Mar. 13, 1934 |
| 2,007,226 | Szayna | July 9, 1935 |
| 2,014,350 | Ayers | Sept. 10, 1935 |
| 2,207,494 | Viktora | July 9, 1940 |
| 2,381,522 | Steward | Aug. 7, 1945 |
| 2,440,673 | Jones | May 4, 1948 |
| 2,698,830 | Jenny | Jan. 4, 1955 |
| 2,913,397 | Murray et al. | Nov. 17, 1959 |